United States Patent

[11] 3,568,947

[72] Inventor Johannes A. E. Oprins
 Sycamore, Ill.
[21] Appl. No. 787,091
[22] Filed Dec. 26, 1968
[45] Patented Mar. 9, 1971
[73] Assignee Ideal Industries, Inc.
 Sycamore, Ill.

[54] FISH TAPE REEL WITH INTERLOCKING TABS
 3 Claims, 3 Drawing Figs.
[52] U.S. Cl. .................................................. 242/85.1,
 242/96, 242/116, 254/134.3
[51] Int. Cl. ............................................................ B65h 75/36
[50] Field of Search .................................................. 242/84.8,
 85, 85.1, 96, 107, 107.2, 115, 116; 254/134.3

[56] References Cited
UNITED STATES PATENTS

| | | | |
|---|---|---|---|
| 1,890,945 | 12/1932 | Hormel ......................... | 242/85.1X |
| 2,603,429 | 7/1952 | Jaworowski et al........... | 242/85.1 |
| 3,424,435 | 1/1969 | Niemann ....................... | 242/84.8X |

Primary Examiner—Stanley N. Gilreath
Assistant Examiner—Werner H. Schroeder
Attorney—Parker, Carter & Markey ABSTRACT: An electrician's fish tape reel including a pair of identical, generally annular shaped reel sections removably connected to each other. The reel sections fit together in alignment through means of tabs and recesses formed in the reel sections adjacent the inner walls thereof. The tabs and recesses fit together only in selected positions of rotation of the reel sections relative to each other.

PATENTED MAR 9 1971
3,568,947
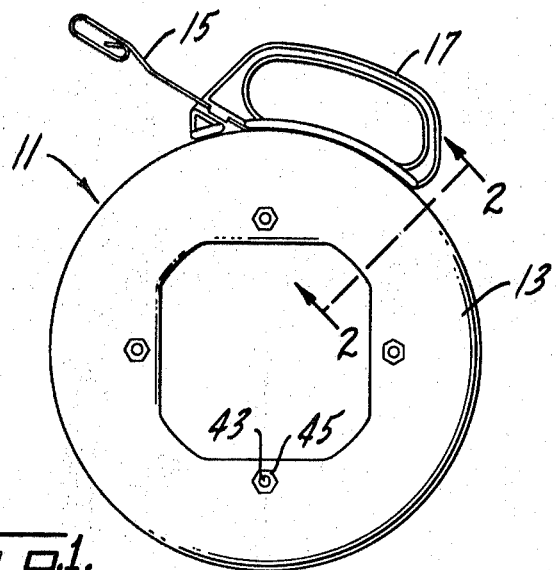
fig.1.
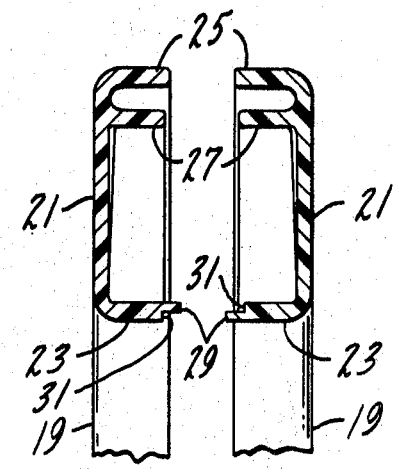
fig.2.
fig.3.
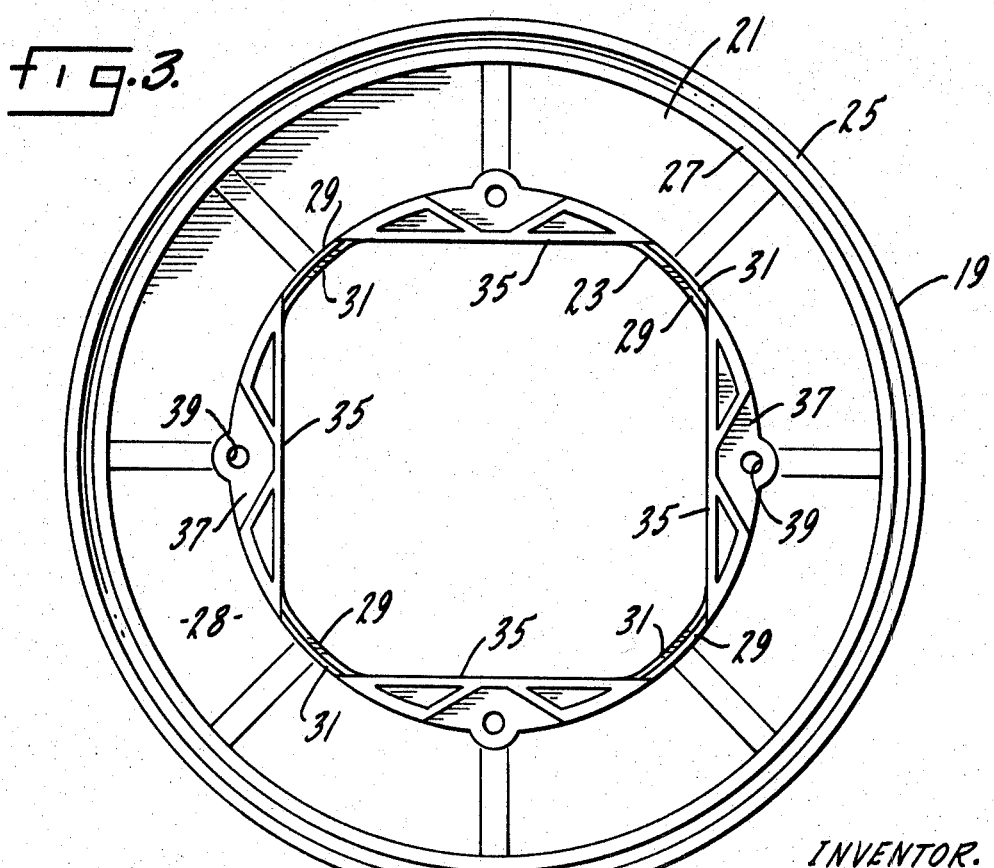
INVENTOR.
Johannes A. E. Oprins
BY Parker, Carter & Markey
Attorneys.

FISH TAPE REEL WITH INTERLOCKING TABS

SUMMARY OF THE INVENTION

This invention relates to an electrician's fish tape reel and more particularly to such a reel formed of identical reel sections having interlocking tabs and recesses which provide alignment for proper connection of the reel sections.

An object of this invention is a fish tape reel that can be made from identically molded reel sections.

Other objects may be found in the following specification, claims and drawings.

BRIEF DESCRIPTION OF THE DRAWINGS

The invention is illustrated more or less diagrammatically in the following drawings wherein:

FIG. 1 is a plan view of an electrician's fish tape reel assembly including a fish tape, a tape winder and a reel of the type embodying the novel features of this invention;

FIG. 2 is an enlarged, exploded, cross-sectional view taken along line 2—2 of FIG. 1 with parts omitted for clarity; and FIG. 3 is an enlarged plan view of a typical reel section.

DESCRIPTION OF THE PREFERRED EMBODIMENT

A fish tape reel assembly is shown in FIG. 1. The assembly includes a reel 13, a fish tape 15 and a fish tape winder 17.

The reel 13 is made of two generally annular shaped sections 19 which may be identically formed of any suitable material, preferably plastic. Each reel section has a generally flat radial or sidewall 21, an upstanding inner peripheral wall 23, an upstanding outer peripheral wall 25 and an upstanding intermediate peripheral wall 27. It should be noted (FIG. 2) that the upstanding intermediate peripheral wall 27 is not as high as the outer peripheral wall 25. The purpose of the intermediate walls 27 is to prevent the coiled tape from interfering with the movement of the tape winder. An annular tape storage chamber 28 is formed between the inner and intermediate peripheral walls.

Arcuate shaped upstanding tabs 29 are formed on the inner peripheral wall 23. Adjacent to each tab and located either inwardly or outwardly radially of the tab is a complementary recess 31. The tabs in the upper left and lower right hand quadrants of the reel section of FIG. 3 are located radially outwardly of the recesses 31 while in the upper right and lower left hand quadrants of the reel section of FIG. 3 the tabs 29 are located radially inwardly of the recesses 31. The tabs 29 extend above the inner peripheral wall 23 a distance equal to the depth of the recesses 31 below the top of the inner peripheral wall.

Although four sets of tabs and recesses are shown in this embodiment of the invention with each set being located 90° apart, the invention should not be limited to this configuration since other configurations may be used. For example, six sets of tabs and recesses may be provided with each set located 60° apart. Another configuration would use two sets located 180° apart. Other combinations may also be possible.

Chordal segments 35 are formed as part of the inner peripheral wall and extend between the sets of tabs and recesses. A portion of each of these chordal segments is cut away at 37 to allow access from the tape storage chamber 28 to openings 39 which extend through the reel section at the cut away portions 37. Four bolts 43 and nuts 45 are used to fasten the reel sections together in the manner shown in FIG. 1 with the bolts extending through the aligned openings 39 of the reel sections.

The use, operation and function of this invention are as follows:

The reel construction of this invention permits a reel to be made from two identical reel sections 13. The reel sections are preferably molded from plastic, although other materials may be suitable.

In assembling the fish tape reel, the fish tape 15 is inserted into the tape storage chamber of one of the reel sections. The end of the fish tape, which is looped, may be extended into one of the cut away portions 37 in the chordal segments 35 of the inner peripheral wall so that when a threaded bolt 43 is extended through the opening 39, it will also extend through the loop to secure the fish tape to the bolt. The fish tape reel of this invention may be used with or without a fish tape winder 17. If a winder is used, it is positioned in one of the reel sections and the fish tape is extended through the winder. The reel sections are assembled by aligning the sections so that the tabs 29 of one reel section fit into the recesses 31 of the other reel section. This will bring about alignment of the openings 39 through which the bolts 43 are extended. The nuts 45 are then screwed onto the bolts to hold the reel sections together.

Whereas a preferred form of the invention has been shown and described, it should be understood that there are many modifications, changes and substitutions that could be made by one skilled in the art. Therefore, the scope of the invention should not be limited to the preferred form shown herein.

I claim:

1. An electrician's fish tape reel including:
    a pair of identical, generally annular shaped sections removably connectable with each other;
    each of said annular sections being generally flat and having upstanding inner and outer peripheral walls with similar walls of each section adapted to contact one another when said sections are connected together;
    at least two sets of interlocking means formed on said inner peripheral wall of each annular section and located circumferentially of each other;
    each of said sets of said interlocking means including an upstanding tab and a recess positioned adjacent to and radially of each other;
    adjacent sets of tabs and recesses being oppositely oriented radially relative to the reel section so that when identical reel sections are brought together and rotated, oppositely oriented tabs and recesses of each reel section will fit together; and
    means to removably hold said reel sections together including openings extending through the reel sections adjacent the inner wall and threaded fasteners extending through the sets of aligned openings, said openings being located between said sets of interlocking means.

2. The structure of claim 1 further characterized in that said tabs and recesses are arcuate in shape.

3. The structure of claim 1 further characterized in that four sets of interlocking means are formed on said inner peripheral wall with said means being located 90° apart.